United States Patent
Cinarkaya et al.

(10) Patent No.: US 10,867,004 B2
(45) Date of Patent: Dec. 15, 2020

(54) PUBLICLY PROVIDING WEB CONTENT OF A TENANT USING A MULTI-TENANT ON-DEMAND DATABASE SERVICE

(71) Applicant: salesforce.com, inc., San Francisco, CA (US)

(72) Inventors: Bulent Cinarkaya, San Jose, CA (US); Steven Tamm, San Francisco, CA (US); Jayesh Sureshchandra, San Francisco, CA (US); Alex Warshavsky, Walnut Creek, CA (US); Irandi Upeka Bulumulla, San Francisco, CA (US); Benjamin Fry, San Francisco, CA (US); Kenneth Douglas Scott, Oakland, CA (US); David Brooks, San Jose, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/817,099

(22) Filed: Nov. 17, 2017

(65) Prior Publication Data

US 2018/0077167 A1     Mar. 15, 2018

Related U.S. Application Data

(63) Continuation of application No. 15/292,708, filed on Oct. 13, 2016, now Pat. No. 9,825,965, which is a
(Continued)

(51) Int. Cl.
*G06F 16/955*     (2019.01)
*G06F 21/60*     (2013.01)
(Continued)

(52) U.S. Cl.
CPC ........ *G06F 16/9566* (2019.01); *G06F 16/282* (2019.01); *G06F 16/951* (2019.01);
(Continued)

(58) Field of Classification Search
CPC ............. G06F 17/30589; G06F 16/282; G06F 16/9566; G06F 16/9535; G06F 16/951; G06F 16/972; G06F 21/10; G06F 21/60; G06F 21/6218; G06F 21/6227; H04L 63/104; H04L 63/102
(Continued)

(56) References Cited

U.S. PATENT DOCUMENTS

| | | | |
|---|---|---|---|
| 6,529,909 B1 * | 3/2003 | Bowman-Amuah | ........................ G06F 16/258 |
| 6,587,836 B1 * | 7/2003 | Ahlberg | .............. G06F 11/0709 705/26.35 |

(Continued)

*Primary Examiner* — Mark E Hershley
(74) *Attorney, Agent, or Firm* — Stene, Kessler, Goldstein & Fox P.L.L.C.

(57) ABSTRACT

In accordance with embodiments, there are provided mechanisms and methods for publicly providing web content of a tenant using a multi-tenant on-demand database service. These mechanisms and methods for publicly providing web content of a tenant using a multi-tenant on-demand database service can allow the web content to be published by a tenant using the multi-tenant on-demand database service for use by non-tenants of the multi-tenant on-demand database service.

20 Claims, 6 Drawing Sheets

Related U.S. Application Data continuation of application No. 15/065,700, filed on Mar. 9, 2016, now Pat. No. 9,491,180, which is a continuation of application No. 13/886,218, filed on May 2, 2013, now Pat. No. 9,298,842, which is a continuation of application No. 13/873,116, filed on Apr. 29, 2013, now abandoned, and a continuation of application No. 13/873,122, filed on Apr. 29, 2013, now Pat. No. 9,219,775, which is a continuation of application No. 12/611,697, filed on Nov. 3, 2009, now Pat. No. 8,661,056, said application No. 13/873,116 is a continuation of application No. 12/611,697, filed on Nov. 3, 2009, now Pat. No. 8,661,056.

(60) Provisional application No. 61/110,851, filed on Nov. 3, 2008.

(51) Int. Cl.

| | | |
|---|---|---|
| *G06F 16/28* | (2019.01) | |
| *G06F 16/951* | (2019.01) | |
| *G06F 16/958* | (2019.01) | |
| *G06F 16/9535* | (2019.01) | |
| *G06F 21/62* | (2013.01) | |
| *H04L 29/08* | (2006.01) | |
| *G06F 21/10* | (2013.01) | |
| *H04L 29/06* | (2006.01) | |

(52) U.S. Cl.
CPC ........ *G06F 16/9535* (2019.01); *G06F 16/972* (2019.01); *G06F 21/10* (2013.01); *G06F 21/60* (2013.01); *G06F 21/6218* (2013.01); *G06F 21/6227* (2013.01); *H04L 63/102* (2013.01); *H04L 63/104* (2013.01); *H04L 67/02* (2013.01); *G06F 2221/0717* (2013.01)

(58) Field of Classification Search
USPC .......................................................... 707/769
See application file for complete search history.

(56) References Cited

U.S. PATENT DOCUMENTS

| | | | | |
|---|---|---|---|---|
| 6,807,558 B1* | 10/2004 | Hassett | ............. | G09F 27/00 |
| | | | | 709/203 |
| 6,845,452 B1* | 1/2005 | Roddy | ............. | H04L 63/02 |
| | | | | 709/223 |
| 7,194,426 B1* | 3/2007 | Box | ............. | G06Q 20/02 |
| | | | | 705/26.1 |
| 7,209,929 B2* | 4/2007 | Dominguez, Jr. | ...... | H04L 29/06 |
| | | | | 707/781 |
| 7,289,976 B2* | 10/2007 | Kihneman | ............. | G06F 16/345 |
| | | | | 707/752 |
| 7,764,952 B1* | 7/2010 | Sipher | ............. | H04M 3/42 |
| | | | | 455/414.1 |
| 7,774,366 B2* | 8/2010 | Fisher | ............. | G06F 16/24575 |
| | | | | 707/784 |
| 7,779,039 B2* | 8/2010 | Weissman | ............. | G06F 16/284 |
| | | | | 707/793 |
| 7,930,412 B2* | 4/2011 | Yeap | ............. | H04L 63/08 |
| | | | | 709/229 |
| 8,121,296 B2* | 2/2012 | Hawkes | ............. | H04L 69/161 |
| | | | | 380/283 |
| 8,224,954 B2* | 7/2012 | Qiu | ............. | H04L 69/26 |
| | | | | 709/224 |
| 8,266,138 B1* | 9/2012 | Collins | ............. | G06F 16/21 |
| | | | | 707/714 |
| 8,266,421 B2* | 9/2012 | Sidman | ............. | H04L 9/0825 |
| | | | | 713/150 |
| 8,756,117 B1* | 6/2014 | Ballaro | ............. | G06Q 30/0603 |
| | | | | 705/26.8 |
| 2001/0020228 A1* | 9/2001 | Cantu | ............. | H04L 9/3213 |
| | | | | 705/50 |
| 2001/0030664 A1* | 10/2001 | Shulman | ............. | H04N 7/165 |
| | | | | 715/835 |
| 2001/0056428 A1* | 12/2001 | Gajda | ............. | G06F 16/252 |
| 2002/0075844 A1* | 6/2002 | Hagen | ............. | H04W 28/16 |
| | | | | 370/351 |
| 2002/0131404 A1* | 9/2002 | Mehta | ............. | H04L 12/1403 |
| | | | | 370/352 |
| 2002/0147611 A1* | 10/2002 | Greene | ............. | G06Q 10/063112 |
| | | | | 705/1.1 |
| 2003/0037237 A1* | 2/2003 | Abgrall | ............. | H04L 63/123 |
| | | | | 713/166 |
| 2003/0050976 A1* | 3/2003 | Block | ............. | H04L 63/105 |
| | | | | 709/203 |
| 2003/0135517 A1* | 7/2003 | Kauffman | ............. | G06F 16/93 |
| 2004/0141616 A1* | 7/2004 | Himmel | ............. | H04L 63/0442 |
| | | | | 380/270 |
| 2005/0055306 A1* | 3/2005 | Miller | ............. | G06Q 10/10 |
| | | | | 705/37 |
| 2005/0065925 A1* | 3/2005 | Weissman | ............. | G06F 21/6218 |
| 2005/0114367 A1* | 5/2005 | Serebrennikov | ....... | G06F 16/951 |
| 2005/0114490 A1* | 5/2005 | Redlich | ............. | H04L 63/10 |
| | | | | 709/223 |
| 2005/0182644 A1* | 8/2005 | Douvikas | ............. | G06Q 20/3674 |
| | | | | 705/26.1 |
| 2005/0223022 A1* | 10/2005 | Weissman | ............. | G06F 16/2291 |
| 2005/0283478 A1* | 12/2005 | Choi | ............. | H04L 67/02 |
| 2006/0013191 A1* | 1/2006 | Kavanagh | ............. | H04L 63/102 |
| | | | | 370/349 |
| 2006/0136582 A1* | 6/2006 | Mills | ............. | G06F 11/3466 |
| | | | | 709/224 |
| 2006/0165104 A1* | 7/2006 | Kaye | ............. | H04M 3/4938 |
| | | | | 370/401 |
| 2006/0195609 A1* | 8/2006 | Han | ............. | H04L 61/1552 |
| | | | | 709/245 |
| 2006/0235714 A1* | 10/2006 | Adinolfi | ............. | G06Q 40/06 |
| | | | | 705/1.1 |
| 2006/0247944 A1* | 11/2006 | Calusinski, Jr. | ........ | G06Q 40/00 |
| | | | | 705/1.1 |
| 2007/0006322 A1* | 1/2007 | Karimzadeh | ....... | G06F 21/6245 |
| | | | | 726/27 |
| 2007/0050467 A1* | 3/2007 | Borrett | ............. | G06Q 10/10 |
| | | | | 709/213 |
| 2007/0078950 A1* | 4/2007 | Hopkins | ............. | H04L 67/02 |
| | | | | 709/217 |
| 2007/0088741 A1* | 4/2007 | Brooks | ............. | G06F 16/283 |
| 2007/0199049 A1* | 8/2007 | Ziebell | ............. | H04L 63/08 |
| | | | | 726/3 |
| 2007/0233291 A1* | 10/2007 | Herde | ............. | G06Q 10/02 |
| | | | | 700/91 |
| 2007/0244983 A1* | 10/2007 | Berger | ............. | H04N 21/631 |
| | | | | 709/217 |
| 2007/0250901 A1* | 10/2007 | McIntire | ............. | H04N 21/8586 |
| | | | | 725/146 |
| 2008/0010365 A1* | 1/2008 | Schneider | ............. | H04L 63/10 |
| | | | | 709/223 |
| 2008/0077995 A1* | 3/2008 | Curnyn | ............. | H04L 63/1441 |
| | | | | 726/27 |
| 2008/0082540 A1* | 4/2008 | Weissman | ............. | G06F 16/289 |
| 2008/0133540 A1* | 6/2008 | Hubbard | ............. | H04L 63/1483 |
| 2008/0162491 A1* | 7/2008 | Becker | ............. | G06F 16/275 |
| 2008/0162544 A1* | 7/2008 | Weissman | ............. | G06F 16/2228 |
| 2008/0168117 A1* | 7/2008 | Coates | ............. | G06F 16/9535 |
| | | | | 709/201 |
| 2008/0177994 A1* | 7/2008 | Mayer | ............. | G06F 9/4418 |
| | | | | 713/2 |
| 2008/0189274 A1* | 8/2008 | Mann | ............. | G06F 16/951 |
| 2008/0201225 A1* | 8/2008 | Maharajh | ............. | H04M 15/41 |
| | | | | 705/14.43 |
| 2008/0209503 A1* | 8/2008 | Hess | ............. | G06Q 10/06 |
| | | | | 726/1 |
| 2008/0250478 A1* | 10/2008 | Miller | ............. | H04W 12/08 |
| | | | | 726/5 |
| 2008/0256082 A1* | 10/2008 | Davies | ............. | G06F 16/2471 |
| 2008/0256083 A1* | 10/2008 | Wakefield | ............. | H04L 65/1073 |

(56) References Cited

U.S. PATENT DOCUMENTS

| | | | | |
|---|---|---|---|---|
| 2008/0256086 A1* | 10/2008 | Miyoshi | G06F 16/40 | |
| 2008/0256250 A1* | 10/2008 | Wakefield | H04L 63/104 | 709/229 |
| 2009/0006156 A1* | 1/2009 | Hunt | G06Q 30/02 | 705/7.11 |
| 2009/0012991 A1* | 1/2009 | Johnson | G06F 16/24573 | |
| 2009/0018996 A1* | 1/2009 | Hunt | G06F 16/2264 | |
| 2009/0037287 A1* | 2/2009 | Baitalmal | G06F 21/105 | 705/27.1 |
| 2009/0037828 A1* | 2/2009 | Waite | G06F 8/38 | 715/760 |
| 2009/0100342 A1* | 4/2009 | Jakobson | G06F 16/29 | 715/733 |
| 2009/0177744 A1* | 7/2009 | Marlow | G06Q 10/10 | 709/204 |
| 2009/0228486 A1* | 9/2009 | Kuehr-McLaren | H04L 63/101 | |
| 2009/0259625 A1* | 10/2009 | Kataoka | G06F 16/907 | |
| 2010/0030734 A1* | 2/2010 | Chunilal | G06Q 10/10 | 707/770 |
| 2010/0106764 A1* | 4/2010 | Chadwick | H04L 67/1002 | 709/202 |
| 2010/0198721 A1* | 8/2010 | Caredda | G06Q 20/10 | 705/39 |
| 2010/0274815 A1* | 10/2010 | Vanasco | G06Q 10/107 | 707/798 |
| 2013/0218948 A1* | 8/2013 | Jakobson | G06Q 30/0641 | 709/203 |
| 2013/0218949 A1* | 8/2013 | Jakobson | G06Q 50/01 | 709/203 |
| 2013/0218966 A1* | 8/2013 | Jakobson | G06Q 30/0241 | 709/204 |

* cited by examiner

PUBLICLY PROVIDING WEB CONTENT OF A TENANT USING A MULTI-TENANT ON-DEMAND DATABASE SERVICE

CLAIM OF PRIORITY

This application is a continuation of U.S. application Ser. No. 15/292,708, filed Oct. 13, 2016, entitled "System, Method and Computer Program Product for Publicly Providing Web Content Using a Multi-Tenant System", which is continuation of U.S. application Ser. No. 15/065,700, filed Mar. 9, 2016, entitled "System, Method and Computer Program Product for Publicly Providing Web Content of a Tenant Using a Multi-Tenant On-Demand Database Service", which is continuation of U.S. application Ser. No. 13/886,218, entitled "System, Method and Computer Program Product for Publicly Providing Web Content of a Tenant Using a Multi-Tenant On-Demand Database Service", filed May 2, 2013, which is a continuation of U.S. application Ser. No. 13/873,116, filed Apr. 29, 2013, and U.S. application Ser. No. 13/873,122, filed Apr. 29, 2013, which are continuations of U.S. application Ser. No. 12/611,697, filed Nov. 3, 2009, which claims the benefit of U.S. Provisional Patent Application No. 61/110,851, filed Nov. 3, 2008, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to providing web content, and more particularly to publicly providing web content.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, entities (e.g. users, organizations, etc.) using such database systems to manage data have only been capable of publishing web content for internal use of the web content. For example, the database systems have not provided a public interface for allowing the web content to be publicized to entities other than those that have access to (e.g. an account with, etc.) the database systems. Thus, in order to publicly provide web content, entities have traditionally been required to publish the web content without use of the database systems, such as by serving the web content from a web server separate from the database systems and optionally configuring the web content to use application program interfaces (APIs) of the database systems to access data stored on such database systems.

BRIEF SUMMARY

In accordance with embodiments, there are provided mechanisms and methods for publicly providing web content of a tenant using a multi-tenant on-demand database service. These mechanisms and methods for publicly providing web content of a tenant using a multi-tenant on-demand database service can allow the web content to be published by a tenant using the multi-tenant on-demand database service for use by non-tenants of the multi-tenant on-demand database service.

In an embodiment and by way of example, a method is provided for publicly providing web content of a tenant using a multi-tenant on-demand database service. In use, information from a tenant of a multi-tenant on-demand database service is received. Additionally, web content is publicly provided to non-tenants of the multi-tenant on-demand database service using the multi-tenant on-demand database service, based on the information.

While the present invention is described with reference to an embodiment in which techniques for publicly providing web content of a tenant using a multi-tenant on-demand database service are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for publicly providing web content of a tenant using a multi-tenant on-demand database service.

To date, database systems have been incapable of being utilized to publish web content to the public. Unfortunately, this requires tenants of database systems to utilize web servers separate from the database systems to publicize web content. Thus, systems and methods are provided for allowing web content of a tenant to be publicly provided using a multi-tenant on-demand database service, such that non-tenants of the multi-tenant on-demand database service may access the web content provided using the multi-tenant on-demand database service.

Next, mechanisms and methods for publicly providing web content of a tenant using a multi-tenant on-demand database service will be described with reference to exemplary embodiments.

Figure 1:
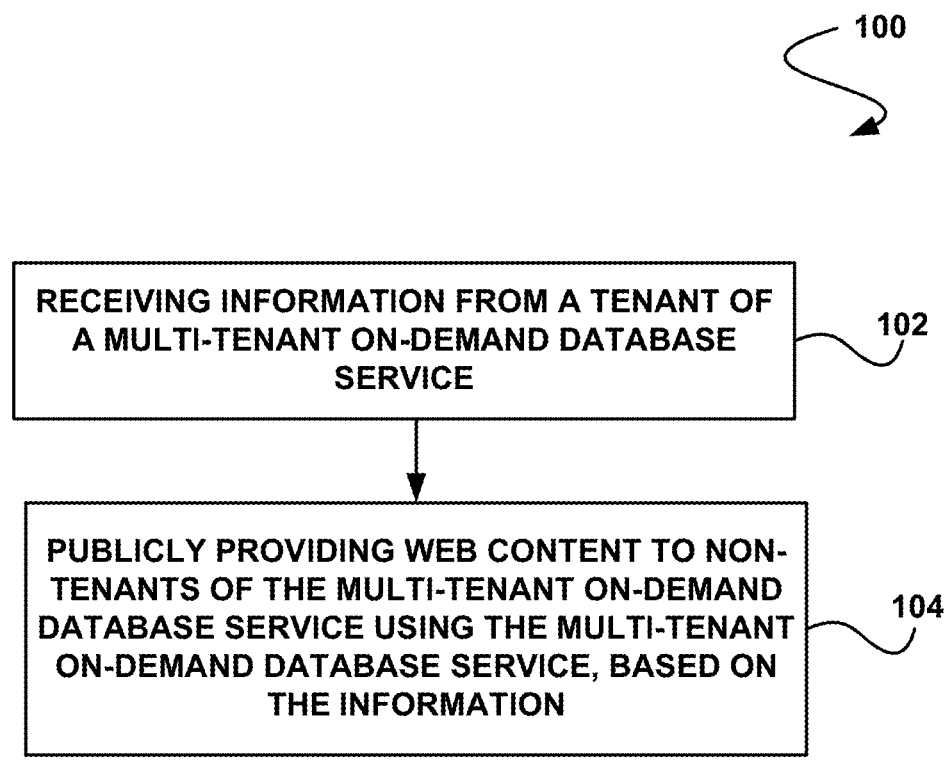
FIG. 1 shows a method for publicly providing web content of a tenant using a multi-tenant on-demand database service, in accordance with one embodiment.

FIG. 1 shows a method 100 for publicly providing web content of a tenant using a multi-tenant on-demand database service, in accordance with one embodiment. As shown, information is received from a tenant of a multi-tenant on-demand database service. See operation 102. In the context of the present description, the multi-tenant on-demand database service may include any service that relies on a database system that is accessible over a network, in which various elements of hardware and software of the database system may be shared by one or more tenants (e.g. customers, organizations, groups, users, etc.). For instance, a given application server may simultaneously process requests for a great number of customers, and a given database table may store rows for a potentially much greater number of customers. Various examples of such a multi-tenant on-demand database service will be set forth in the context of different embodiments that will be described during reference to subsequent figures.

To this end, the tenant of the multi-tenant on-demand database service may include any entity (e.g. customer, organization, group, user, etc.) that is permitted to access the multi-tenant on-demand database service. For example, the tenant may be registered with the multi-tenant on-demand database service. Thus, use of the multi-tenant on-demand database service by the tenant may only be allowed upon authentication (e.g. registration, login, etc.) of the tenant with the multi-tenant on-demand database service.

Also, the information may be received from the tenant by the multi-tenant on-demand database service. As noted above, the multi-tenant on-demand database service may optionally only be accessible by the tenant upon authentication of the tenant with the multi-tenant on-demand database service. To this end, and strictly as an option, the information may only be capable of being received from the tenant by the multi-tenant on-demand database service upon the authentication of the tenant with the multi-tenant on-demand database service.

In one embodiment, the information may be received utilizing a graphical user interface (GUI) of the multi-tenant on-demand database service. For example, the GUI may include at least one field for receiving the information. In this way, the information may optionally be received as text.

In another embodiment, the information may be received from the tenant as metadata utilizing a development environment of the multi-tenant on-demand database service. For example, the development environment may include a metadata application program interface (API) via which the information is received from the tenant. It should be noted that the metadata may include any type of code that is readable by the development environment.

Additionally, the information that is received from the tenant may include any information based on which web content may be provided, as described in more detail below. In one embodiment, the information may include a domain name. Such domain name may include the identifier [e.g. uniform resource locator (URL), etc.] by which the web content is to be accessed. Optionally, the domain name may be received by the tenant registering the domain name via the multi-tenant on-demand database service.

In another embodiment, the information may include security settings for the web content. The security settings may include at least one rule according to which the web content may be accessed. For example, the rules may indicate database tables (e.g. of the multi-tenant on-demand database service) that are allowed to be publicly accessed by non-tenants of the multi-tenant on-demand database service (e.g. entities not authorized to use the multi-tenant on-demand database service), a level of access to the database tables by the non-tenants (e.g. read, create, edit, delete, etc.), fields of the database tables that are allowed to be publicly accessed by the non-tenants, records of the database tables that are allowed to be publicly accessed by the non-tenants, internet protocol (IP) addresses that are restricted from accessing the web content, etc.

In yet another embodiment, the information may include a billing configuration based on which a provision of the web content is billed. For example, the billing configuration may indicate that the tenant is to be automatically charged for views of the web content (e.g. by the non-tenants) that exceed a predetermined threshold of views of the web content. As another example, the billing configuration may indicate views of the web content that exceed a predetermined threshold of views of the web content are to be blocked, such that the tenant is not charged for the excessive views of the web content.

In still yet another embodiment, the information may include the web content. In various embodiments the web content may include a website (e.g. public website, Internet website, microsite, etc. such as an e-commerce website, a recruiting website, a community website, etc.) a web service [e.g. Really Simple Syndication (RSS)], and/or any other content that is made publicly available to the non-tenants using the multi-tenant on-demand database service. Optionally, the web content may be received in the form of an application.

Furthermore, as shown in operation 104, the web content is publicly provided to non-tenants of the multi-tenant on-demand database service using the multi-tenant on-demand database service, based on the information. With respect to the present description, publicly providing the web content may include the multi-tenant on-demand database service providing the web content in any manner based on the information which makes the web content accessible to the non-tenants of the multi-tenant on-demand database service. As noted above, the web content may include a website, web service, etc.

Accordingly, the web content may be publicly provided by publishing the web content based on the information such that the web content may be accessed by the non-tenants. As another option, the web content may be publicly provided by sending the web content to the non-tenants upon receipt of a request from the non-tenants for such web content.

In one embodiment, the web content may be publicly provided to the non-tenants based on the information by providing the web content in response to receipt of a request including the domain name associated with the web content from the non-tenants. In another embodiment, the web content may be publicly provided to the non-tenants based on the information by providing the web content in response to a determination that the security settings associated with the web content allow the provision of the web content. In still yet another embodiment, the web content may be publicly provided to the non-tenants based on the information in response to a determination that the billing configuration allows for the web content to be provided (e.g. the billing configuration does not block the provision of the web content when a threshold placed on the provision of the web content has been reached, etc.).

To this end, information received from a tenant of a multi-tenant on-demand database service may be used such that the multi-tenant on-demand database service may publicly provide web content to non-tenants of the multi-tenant on-demand database service. For example, the multi-tenant on-demand database service may store the web content for the public provision thereof (based on the information) to the non-tenants of the multi-tenant on-demand database service.

Figure 2:
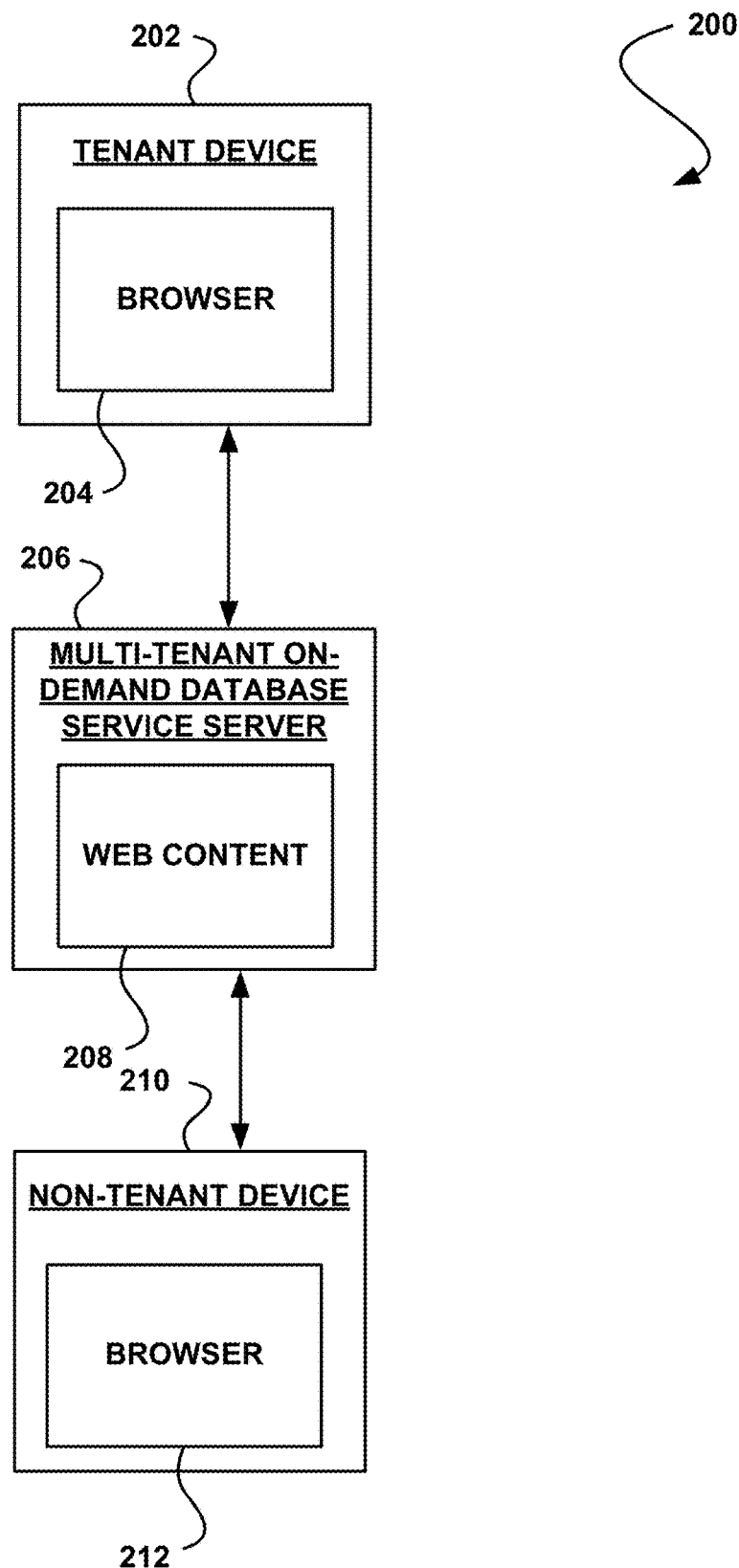
FIG. 2 shows a system for publicly providing web content of a tenant using a multi-tenant on-demand database service, in accordance with another embodiment.

FIG. 2 shows a system 200 for publicly providing web content of a tenant using a multi-tenant on-demand database service, in accordance with another embodiment. As an option, the present system 200 may be implemented in the context of the functionality of FIG. 1. Of course, however, the system 200 may be implemented in any desired environment. The aforementioned definitions may apply during the present description.

As shown, a tenant device 202 is in communication with a multi-tenant on-demand database service server 206. For example, the tenant device 202 may be in communication with the multi-tenant on-demand database service server 206 via a network (e.g. the Internet, etc.). It should be noted that the tenant device 202 may include any desired client device (e.g. computer, etc.) from which information may be sent to the multi-tenant on-demand database service server 206.

To this end, in the context of the present embodiment, the multi-tenant on-demand database service server 206 receives information from the tenant device 202. For example, the tenant device 202 may include a browser 204 for sending the information to the multi-tenant on-demand database service server 206. The browser 204 may optionally be used to access a GUI and/or a metadata API of the multi-tenant on-demand database service server 206 (e.g. upon authentication of a tenant of the multi-tenant on-demand database service using the tenant device 202 with the multi-tenant on-demand database service server 206) for allowing the tenant to use the tenant device 202 to submit the information to the multi-tenant on-demand database service server 206.

Upon receipt of the information, the multi-tenant on-demand database service server 206 publicly provides web content 208 to a non-tenant of the multi-tenant on-demand database service, based on the information received from the tenant device 202. As shown, the web content 208 may be stored on the multi-tenant on-demand database service server 206. Further, the web content 208 may be publicly provided to the non-tenant by allowing a non-tenant device 210 of the non-tenant to access the web content 208. For example, a browser 212 of the non-tenant device 212 may be used to access the web content 208. Optionally, the multi-tenant on-demand database service server 206 may be used by the tenant of the tenant device 202 to code, compile, test, and deploy the web content 208.

In one exemplary embodiment, the information received from the tenant device 202 may include the web content 208, security settings according to which the web content 208 may be publicly provided, a domain name by which the web content 208 may be publicly provided, etc., such that the multi-tenant on-demand database service server 206 may use the information received from the tenant device 202 for publicly providing the web content 208 to the non-tenant device 210. For example, the non-tenant may enter the domain name associated with the web content 208 into the browser 212 of the non-tenant device 210 for requesting the web content 208. The browser 212 may send a request including the domain name to the multi-tenant on-demand database service server 206, which may response to the request with the web content 208, based on the security settings.

It should be noted that the multi-tenant on-demand database service may be integrated with a plurality of different applications, such that the web content may utilize the functionality of such applications. For example, the multi-tenant on-demand database service may be integrated with a billing application for billing the tenant for the public provision of the web content. As another example, the multi-tenant on-demand database service may be integrated with a content delivery network application for allowing the web content to be cached as various locations across the world. As yet another example, the multi-tenant on-demand database service may be integrated with an authentication application for authenticating non-tenants accessing the web content (e.g. for allowing the non-tenant to make a purchase via the web content where the web content includes an e-commerce website, etc.). As yet another example, the multi-tenant on-demand database service may be integrated with a domain name registration application for allowing the tenant to register the domain name for use thereof with respect to the web content.

Figure 3:
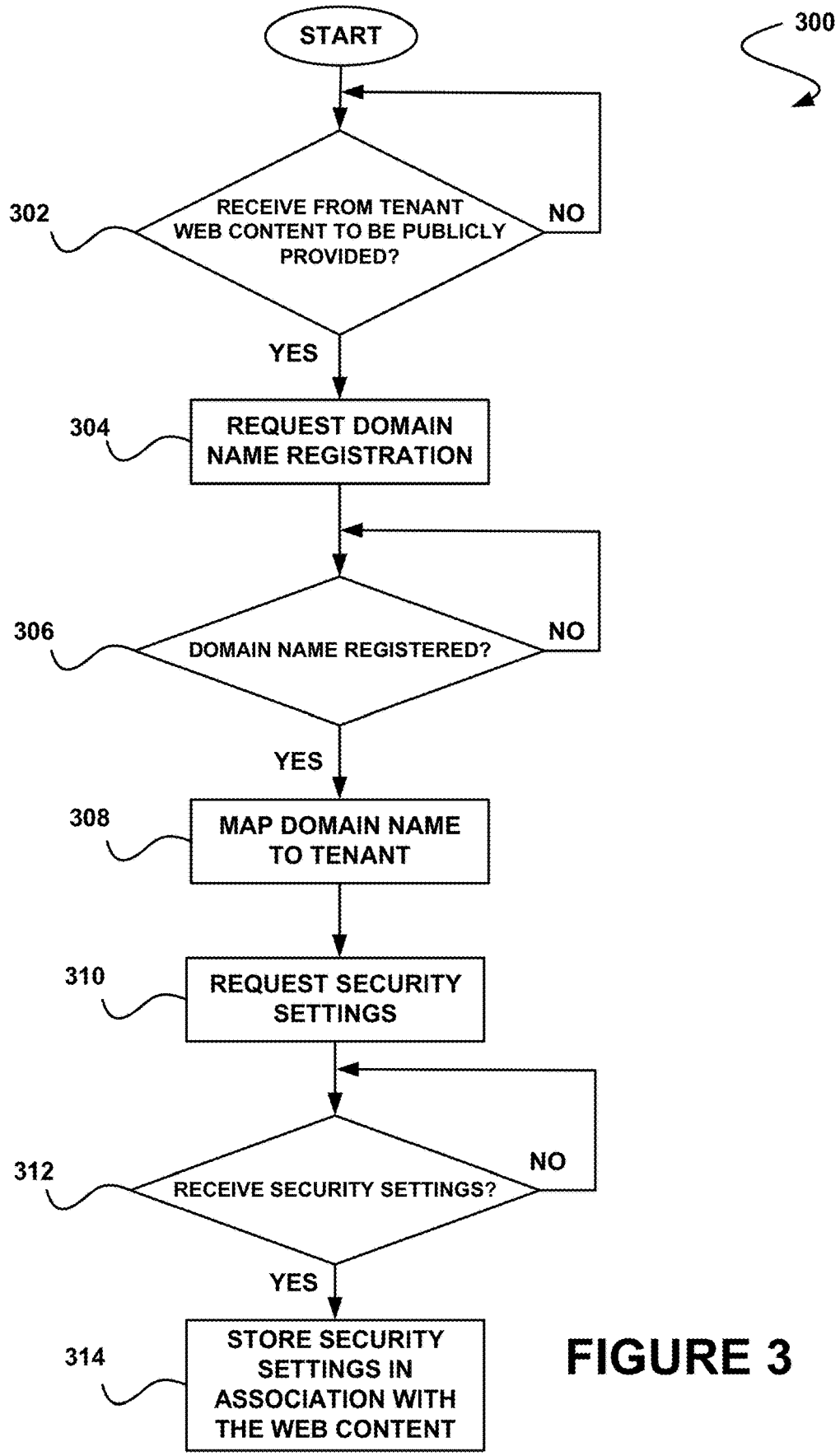
FIG. 3 shows a method for receiving information from a tenant of a multi-tenant on-demand database service for use in publicly providing web content, in accordance with yet another embodiment.

FIG. 3 shows a method 300 for receiving information from a tenant of a multi-tenant on-demand database service for use in publicly providing web content, in accordance with yet another embodiment. As an option, the method 300 may be carried out in the context of the functionality of FIGS. 1-2. For example, the method 300 may be carried out using the multi-tenant on-demand database service server 206 of FIG. 2. Of course, however, the method 300 may be carried out in any desired environment. Again, the aforementioned definitions may apply during the present description.

It should be noted that while the operations in the method 300 are shown in a particular sequence, the operations may be performed in any desired sequence. As shown, it is determined whether web content to be publicly provided is received from a tenant. See decision 302. For example, it may be determined whether a web site, web service, etc. has been received from the tenant. As an option, the web content may include a template of an application provided by a multi-tenant on-demand database service which is customized (e.g. branded, etc.) by the tenant. As another option, the web content may include a custom application generated by the tenant.

In the context of the present embodiment, it may be determined whether the web content is received by the multi-tenant on-demand database service. For example, the web content may be capable of being received via a GUI of the multi-tenant on-demand database service and/or a metadata API of the multi-tenant on-demand database service. If it is determined that web content to be publicly provided is not received from a tenant, the method 300 continues to wait for such web content to be received.

If, however, it is determined that web content to be publicly provided is received from a tenant, registration of a domain name is requested. See operation 304. For example, the GUI described above may request that a domain name for the web content be registered may be displayed to the tenant. Optionally, the GUI may be integrated with a domain name registration application of the multi-tenant on-demand database service, such that the domain name registration application may be used for registering a domain name submitted by the tenant.

In decision 306 it is determined whether a domain name is registered for the web content. For example, it may be determined whether the tenant has registered a domain name for the web content via the domain name registration application. If it is determined that a domain name has not been registered, the method 300 continues to wait for a domain name to be registered.

If, however, it is determined that a domain name is registered, the domain name is mapped to the tenant. See operation 308. For example, the multi-tenant on-demand database service may map the domain name to an account that the tenant has established (e.g. via registration, etc.) with the multi-tenant on-demand database service.

Further, as shown in operation 310, security settings for the web content are requested. The security settings may include any rules according to which the web content may be publicly provided. For example, the security settings may indicate which database tables associated with the tenant's account are allowed to be accessed, etc.

Optionally, the GUI described above may request that security settings for the web content be configured. Optionally, the GUI may be integrated with a security application of the multi-tenant on-demand database service, such that the security application may be used by the tenant for configuring the security settings.

Next, it is determined whether the security settings are received. See decision 312. If it is determined that security settings are not received, the method 300 continues to wait for receipt of such security settings. If, however, it is determined that security settings are received, the security settings are stored in association with the web content, as shown in operation 314. Thus, the security settings may only be applied with respect to a public provision of the particular web content determined to be received in decision 302.

Figure 4:
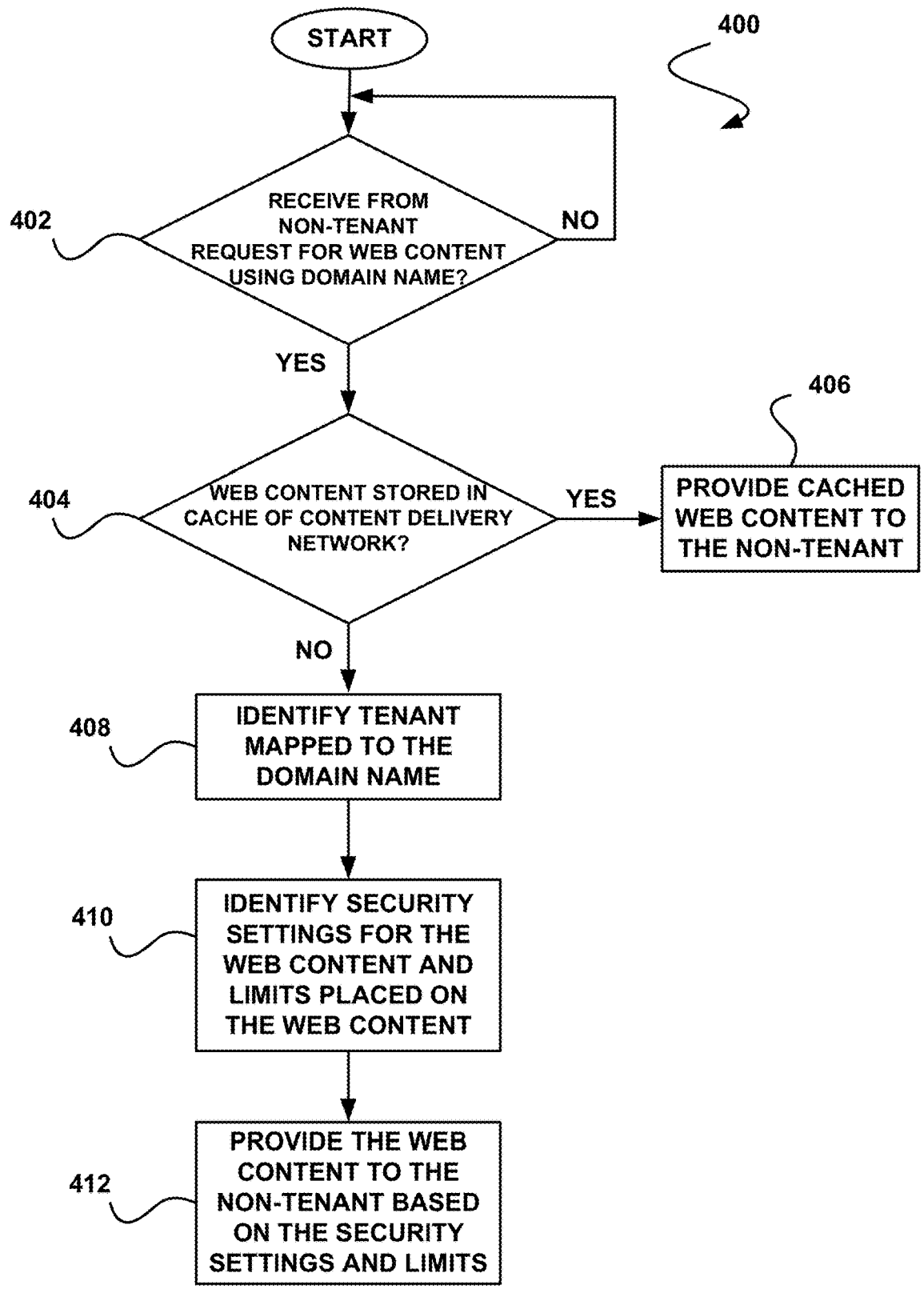
FIG. 4 shows a method for publicly providing web content of a tenant of a multi-tenant on-demand database service to a non-tenant of the multi-tenant on-demand database service, in accordance with still yet another embodiment.

FIG. 4 shows a method 400 for publicly providing web content of a tenant of a multi-tenant on-demand database service to a non-tenant of the multi-tenant on-demand database service, in accordance with still yet another embodiment. As an option, the method 400 may be carried out in the context of the functionality of FIGS. 1-3. For example, the method 400 may be carried out using the multi-tenant on-demand database service server 206 of FIG. 2, based on the information received in the method 300 of FIG. 3, etc. Of course, however, the method 400 may be carried out in any desired environment. Again, the aforementioned definitions may apply during the present description.

As shown in decision 402, it is determined whether a request for web content has been received from a non-tenant using a domain name. In the context of the present embodiment, receipt of the request may include any receipt of the request by a multi-tenant on-demand database service. For example, the request for the web content may be submitted by the non-tenant (and thus received from the non-tenant) in response to the non-tenant entering the domain name into a browser of a device of the non-tenant. To this end, the request may include the domain name.

If it is determined that the request is not received, the method 400 continues to wait for such a request to be received. If, however, it is determined that the request is received, it is further determined whether the web content is stored in cache of a content delivery network. See decision 404. To this end, the content delivery network may include an application integrated with the multi-tenant on-demand database service. For example, the content delivery network may include servers located at various locations across the world which cache web content recently requested within a particular vicinity of such locations.

If it is determined that the web content is stored in the cache of the content delivery network, the web content is provided to the non-tenant from the cache. See operation 406. Thus, for example, the web content may be sent from the cache to the browser of the device of the non-tenant. In this way, the web content may be publicly provided to the non-tenant in response to the receipt of the request for the web content from the non-tenant by the multi-tenant on-demand database service (as described in decision 402).

If, however, it is determined that the web content is not stored in the cache of the content delivery network, a tenant mapped to the domain name is identified. See operation 408. For example, an account of a tenant with the multi-tenant on-demand database service may be identified based on a mapping of the same to the domain name.

Upon identification of the tenant, security settings for the web content is identified in addition to limits placed on the web content, as shown in operation 410. For example, the tenant account identified based on the mapping may store the security settings, such that the security settings may be identified based on the identification of the tenant. The security settings may be stored in association with the web content, such that the security settings may be specifically applied to the web content in response to the request for the web content by the non-tenant.

Further, the limits may be configured automatically based on a type (e.g. a level) of the account held by the tenant, such that the limits may be identified based on the identification of the tenant. It should be noted that the limits may include any threshold allowances provided with respect to the web content (e.g. for managing resource utilization, etc. of the multi-tenant on-demand database service that is shared among a plurality of tenants, etc.).

In one embodiment, the limits may indicate a threshold amount of web content of the tenant that is allowed to be publicly provided by the multi-tenant on-demand database service. In another embodiment, the limits may indicate an amount of resource utilization (e.g. processor usage, etc.) that is allowed with respect to the public provision of web content of the tenant by the multi-tenant on-demand database service. In yet another embodiment, the limits may indicate a threshold number of views of the web content that is allowed for the particular web content or for all web content of the tenant. Accordingly, a monitoring application of the multi-tenant on-demand database service may be integrated with the provisioning of the web content for collecting information associated with the limits, such that it may be determined whether the limits have been met.

As shown in operation 412, the web content is provided to the non-tenant based on the security settings and the limits. In this way, the web content may be publicly provided to the non-tenant in response to the receipt of the request for the web content from the non-tenant by the multi-tenant on-demand database service (as described in decision 402). In one embodiment, the multi-tenant on-demand database service may only provide portions of the web content to the non-tenant as allowed by the security settings. In another embodiment, the multi-tenant on-demand database service may only provide the web content in response to a determination that the limits placed on the web content have not been met.

As noted above with respect to operation 406, a determination of whether the limits have been met may not necessarily be made if the web content is provided from the cache of a content delivery network. As a result of the limits being set for ensuring sharing of the public provision of web content among a plurality of tenants of the multi-tenant on-demand database service, he limits may not necessarily be taken into consideration when the web content is provided from the cache of the content delivery network, since only resources of the content delivery network may be consumed (thus preventing consumption of resources of the multi-tenant on-demand database service).

Of course, with respect to some of the limits, the tenant may configure billing options to allow the limits to be automatically increased, in exchange for a fee. Thus, the tenant may configure the billing options to allow a billing application integrated with the multi-tenant on-demand database service to automatically charge for each occurrence of a predefined limit being exceeded when the web content is provided to a non-tenant. In this way, the non-tenant may optionally be provided with the web content even when the limits have been met, based on the billing configuration.

System Overview

Figure 5:
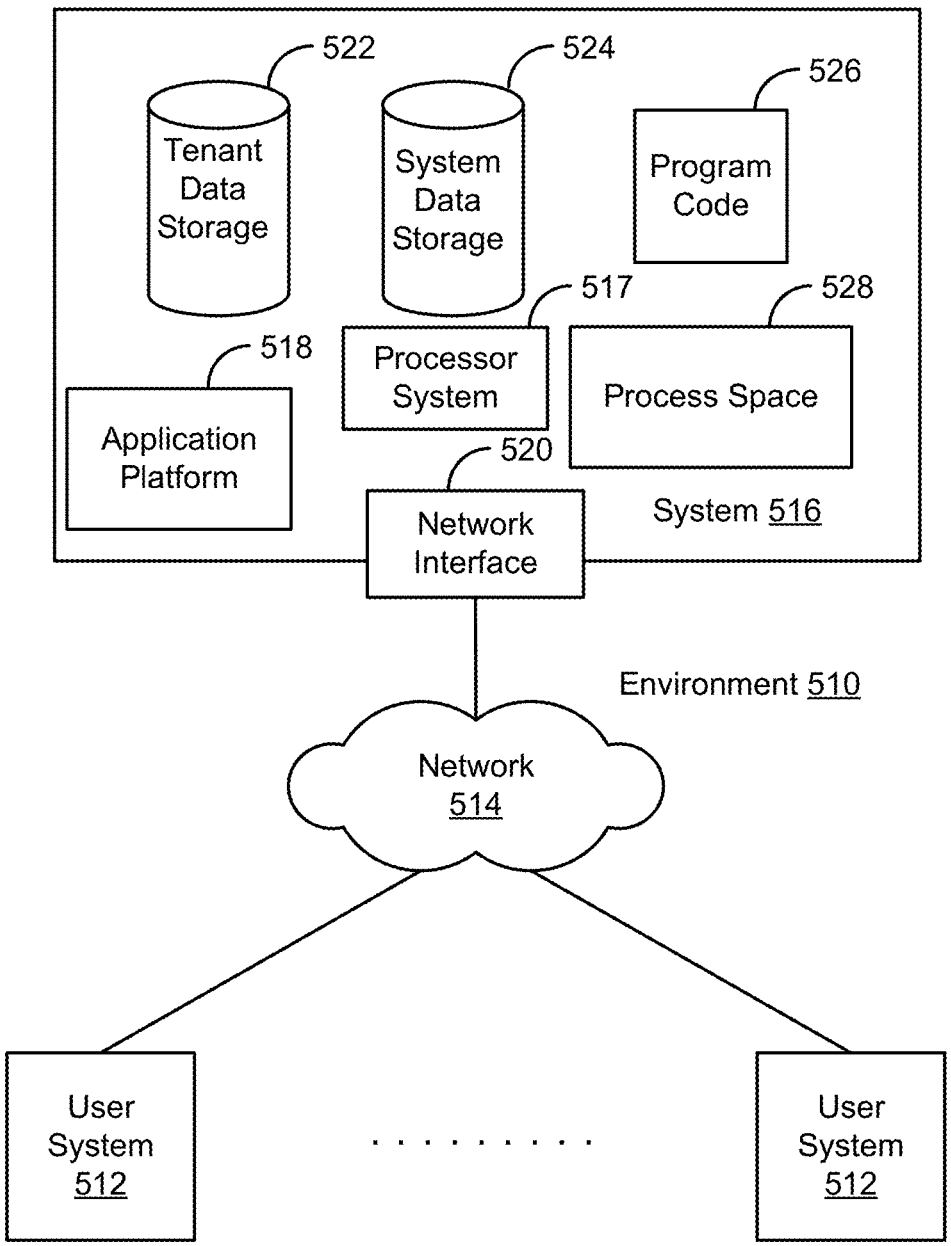
FIG. 5 illustrates a block diagram of an example of an environment wherein an on-demand database service might be used.

FIG. 5 illustrates a block diagram of an environment 510 wherein an on-demand database service might be used. As an option, any of the previously described embodiments of the foregoing figures may or may not be implemented in the context of the environment 510. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

Figure 6:
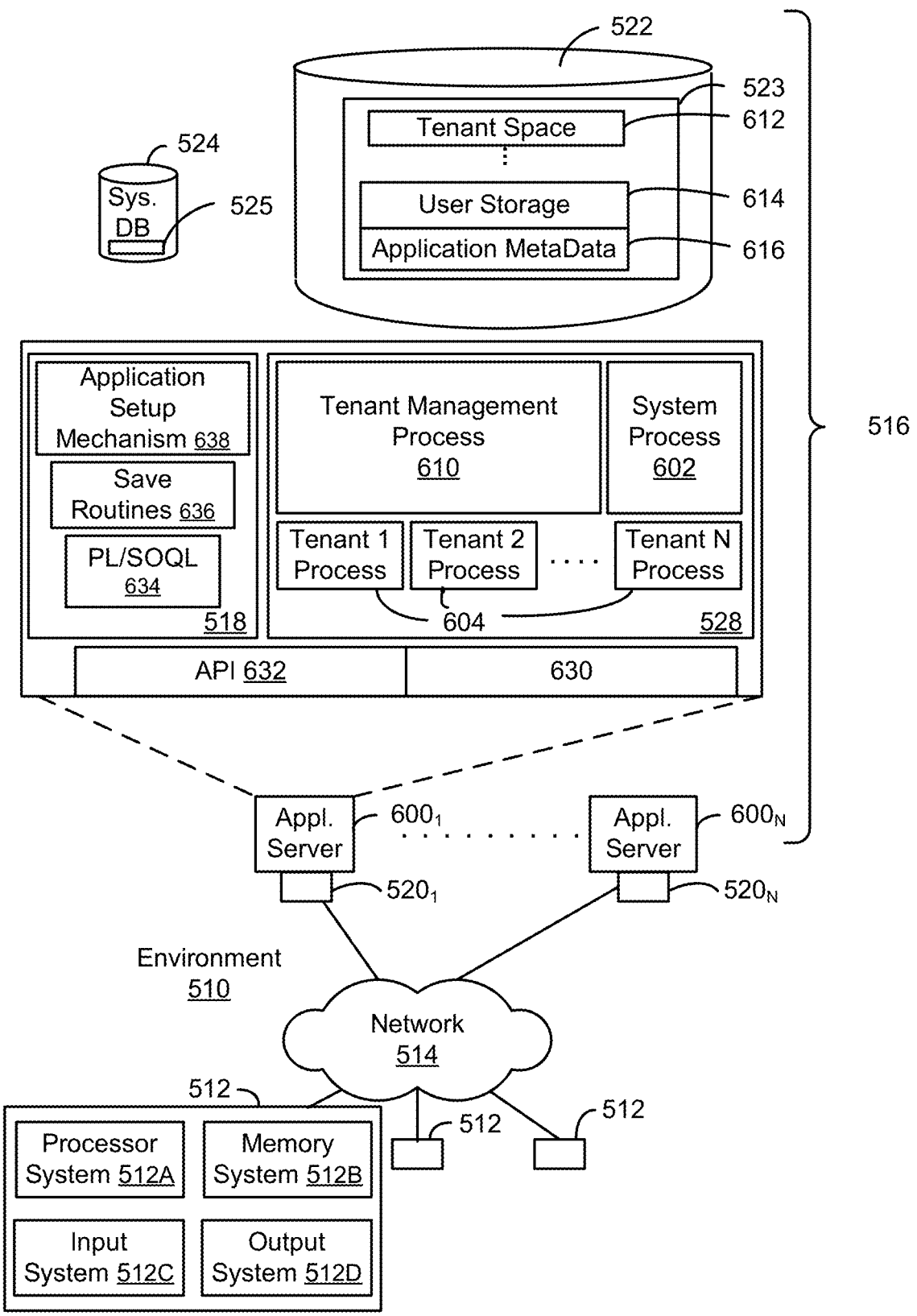
FIG. 6 illustrates a block diagram of an embodiment of elements of FIG. 5 and various possible interconnections between these elements.

One arrangement for elements of system 516 is shown in FIG. 6, including a network interface 520, application platform 518, tenant data storage 522 for tenant data 523, system data storage 524 for system data accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517 of FIG. 5, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Provisional Patent Application 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; US2006/0206834, titled "SYSTEMS AND METHODS FOR IMPLEMENTING MULTI-APPLICATION TABS AND TAB SETS," filed Mar. 8, 2005; US2008/0010243, titled "METHOD AND SYSTEM FOR PUSHING DATA TO A PLURALITY OF DEVICES IN AN ON-DEMAND SERVICE ENVIRONMENT," filed Jun. 1, 2007; and/or US 2009/0037828 titled "SYSTEM, METHOD AND COMPUTER PROGRAM PRODUCT FOR EDITING AN ON-DEMAND DATABASE SERVICE GRAPHICAL USER INTERFACE," filed Jul. 17, 2008, which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
receiving, by one or more processors, web content, security settings, and a universal resource locator (URL) from a subscriber of an on-demand database service, wherein the subscriber is associated with an account level, wherein the URL specifies an access location for the web content, and wherein the security settings comprise a rule indicating at least a portion of a database table of the web content configured to be made accessible via a web interface to a non-subscriber via the URL and a level of access by the non-subscriber to the at least a portion of a database table of the web content;
receiving, by the one or more processors, a request from the non-subscriber for the web content containing the URL;
identifying, by the one or more processors, the security settings for the web content and the subscriber associated with the URL;
determining, by the one or more processors, the at least a portion of a database table that the security settings allow to be publically provided to the non-subscriber and a threshold based on the account level associated with the subscriber; and
providing, by the one or more processors, the at least a portion of a database table to the non-subscriber when the threshold has not been met.

2. The method of claim 1, wherein the security settings further comprise one or more fields of the at least a portion of a database table that are permitted to be accessed by the non-subscriber.

3. The method of claim 1, wherein the security settings further comprise one or more records of the at least a portion of a database table that are permitted to be accessed by the non-subscriber.

4. The method of claim 1, wherein the security settings further comprise one or more internet protocol (IP) addresses that are restricted from accessing the web content.

5. The method of claim 1, wherein the threshold is a threshold number of views of the at least a portion of a database table.

6. The method of claim 1, wherein the threshold is a threshold number of views for the web content.

7. The method of claim 1, wherein the threshold is a threshold allowance of processor usage.

8. A non-transitory computer readable medium, having instructions for providing content of subscribing users to a non-subscriber, which instructions when executed by one or more processors perform:
receiving web content, security settings, and a universal resource locator (URL) from a subscriber of an on-demand database service, wherein the subscriber is associated with an account level, wherein the URL specifies an access location for the web content, and wherein the security settings comprise a rule indicating at least a portion of a database table of the web content configured to be made accessible to the non-subscriber via a web interface via the URL and a level of access by the non-subscriber to the at least a portion of a database table of the web content;
receiving a request from the non-subscriber for the web content containing the URL;
identifying the security settings for the web content and the subscriber associated with the URL;
determining at least a portion of a database table that the security settings allow to be publically provided to the non-subscriber and a threshold based on the account level associated with the subscriber; and
providing the at least a portion of at least one database table to the non-subscriber when the threshold has not been met.

9. The non-transitory computer readable medium of claim 8, wherein the security settings further comprise one or more fields of the at least a portion of a database table that are permitted to be accessed by the non-subscriber.

10. The non-transitory computer readable medium of claim 8, wherein the security settings further comprise one or more records of the at least a portion of a database table that are permitted to be accessed by the non-subscriber.

11. The non-transitory computer readable medium of claim 8, wherein the security settings further comprise one or more internet protocol (IP) addresses that are restricted from accessing the web content.

12. The non-transitory computer readable medium of claim 8, wherein the threshold is a threshold number of views for the web content.

13. The non-transitory computer readable medium of claim 8, wherein the threshold is a threshold allowance of processor usage.

14. A system, comprising:
a memory; and
at least one processor coupled to the memory and configured to:
receive web content, security settings, and a universal resource locator (URL) from a subscriber on an on-demand database service, wherein the subscriber is associated with an account level, wherein the URL specifies an access location for the web content, and wherein the security settings comprise a rule indicating at least a portion of a database table of the web content configured to be made accessible to a non-subscriber via a web interface via the URL and a level of access by the non-subscriber to the at least a portion of a database table of the web content;
receive a request from the non-subscriber for the web content containing the URL,
identify the security settings for the web content and the subscriber associated with the URL;
determine the at least a portion of a database table that the security settings allow to be publically provided to the non-subscriber and a threshold based on the account level associated with the subscriber; and
provide the at least a portion of a database table to the non-subscriber when the threshold has not been met.

15. The system of claim 14, wherein the security settings further comprise one or more fields of the at least a portion of a database table that are permitted to be accessed by the non-subscriber.

16. The system of claim 14, wherein the security settings further comprise one or more records of the at least a portion of a at least one database table of the web content.

17. The system of claim 14, wherein the security settings further comprise one or more internet protocol (IP) addresses that are restricted from accessing the web content.

18. The system of claim 14, wherein the threshold is a threshold number of views of the at least a portion of a database table.

19. The method of claim 14, wherein the threshold is a threshold number of views for the web content.

20. The system of claim 14, wherein the threshold is a threshold allowance of processor usage.

* * * * *